UNITED STATES PATENT OFFICE.

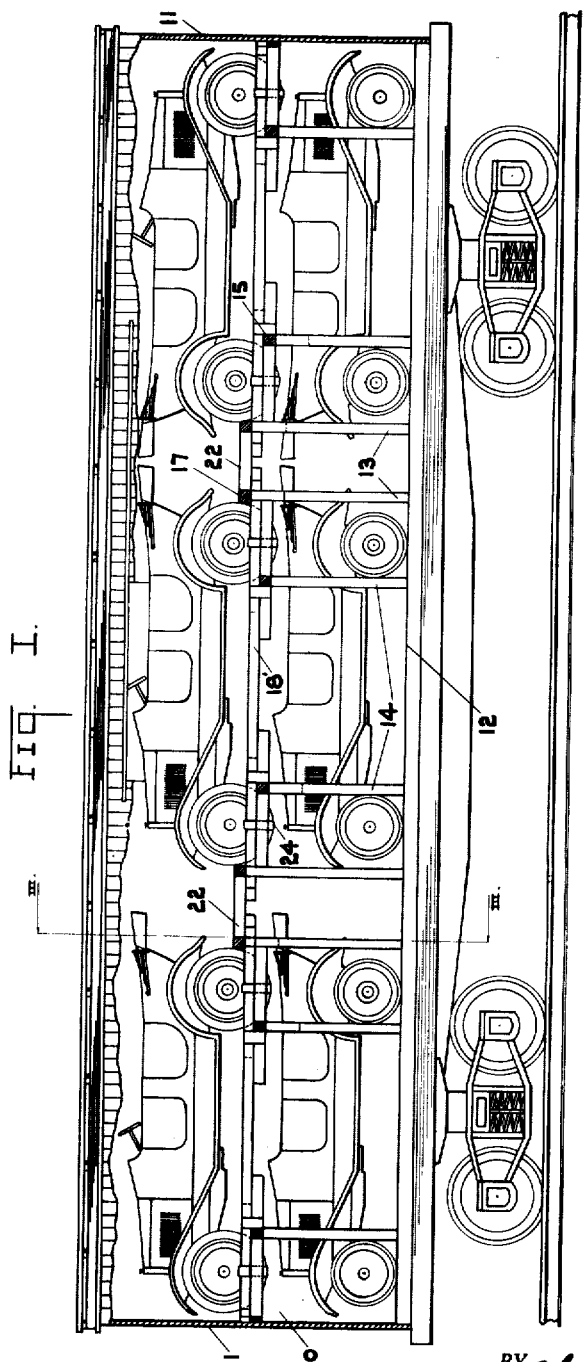

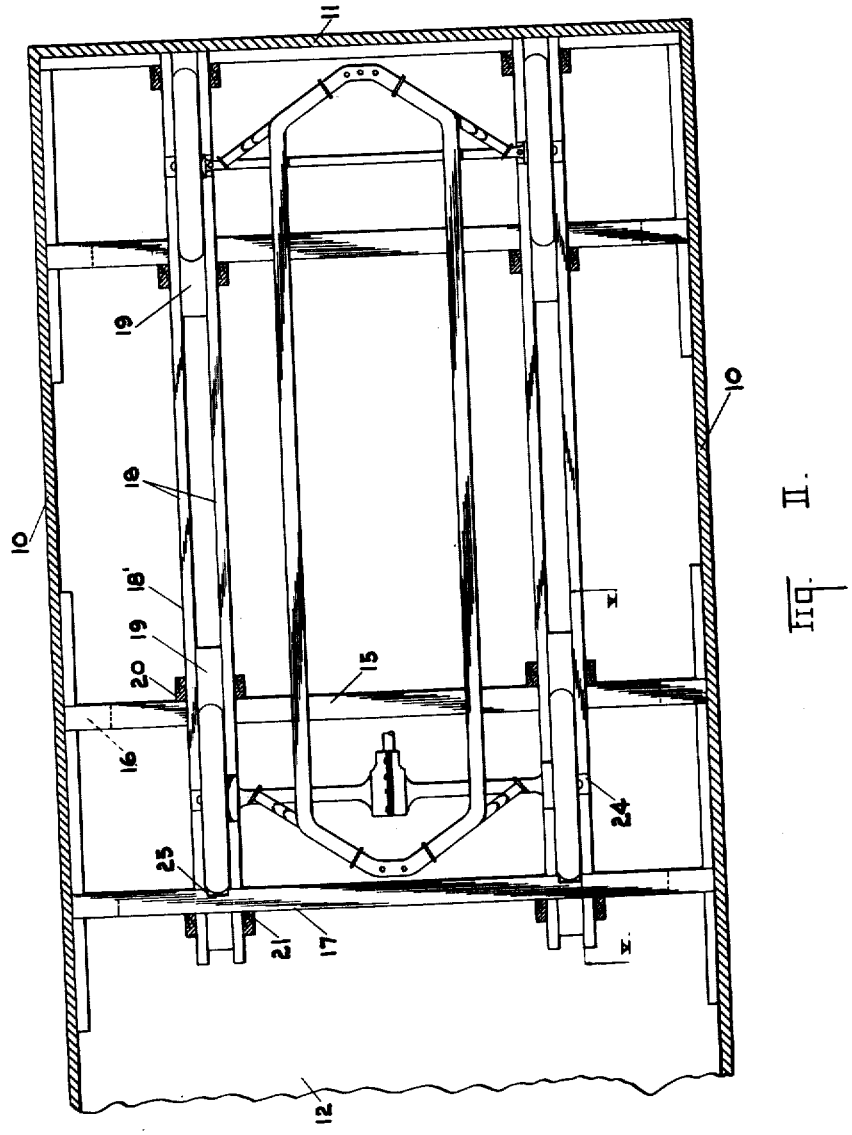

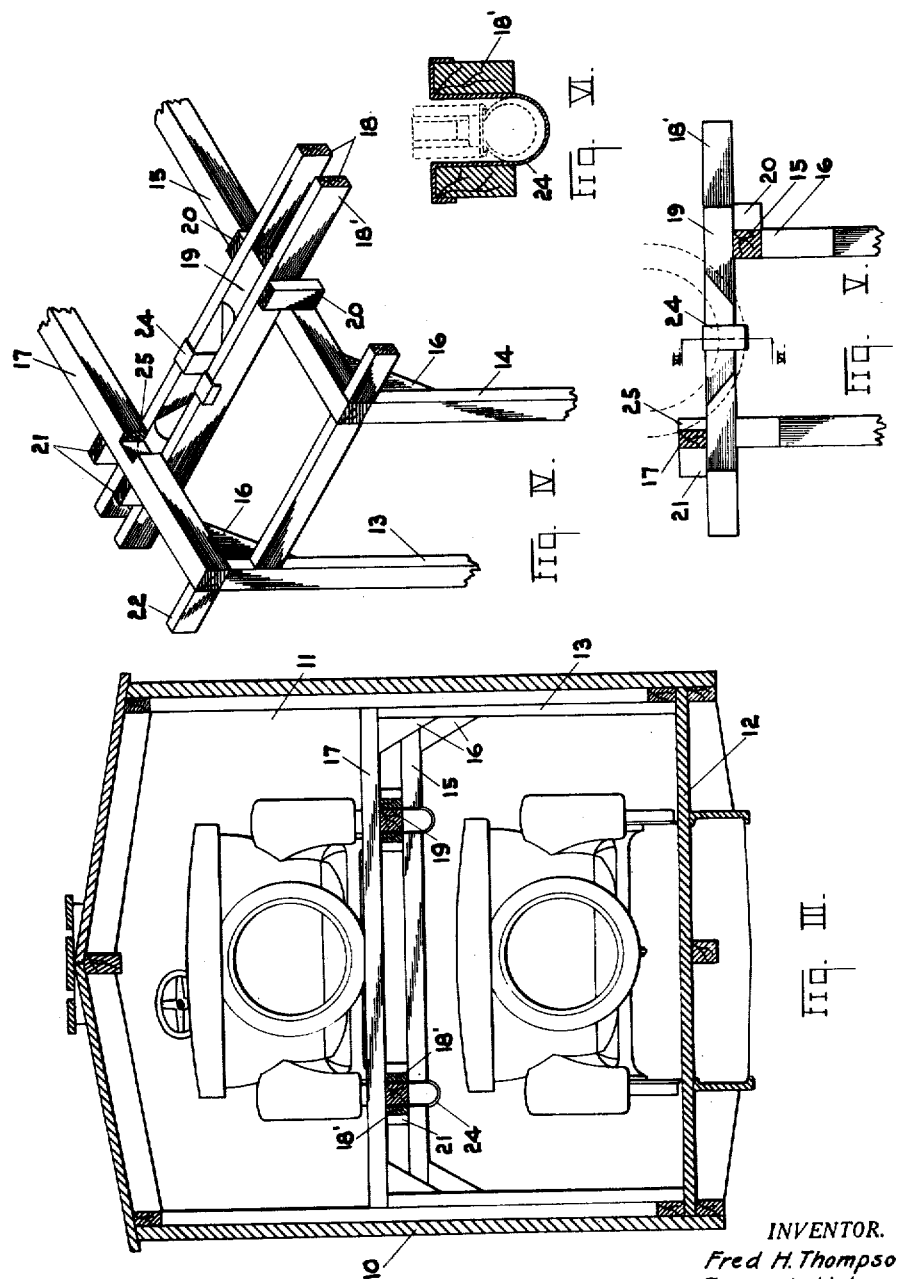

FRED H. THOMPSON AND EDWARD HOLMES, OF TOLEDO, OHIO, ASSIGNORS TO THE WILLYS-OVERLAND COMPANY, OF TOLEDO, OHIO, A CORPORATION OF OHIO.

AUTOMOBILE DECKING.

1,421,747.  Specification of Letters Patent.  Patented July 4, 1922.

Application filed February 3, 1921. Serial No. 442,105.

*To all whom it may concern:*

Be it known that we, FRED H. THOMPSON and EDWARD HOLMES, citizens of the United States, residing at Toledo, in the county of Lucas and State of Ohio, have invented certain new and useful Improvements in Automobile Decking, of which we declare the following to be a full, clear, and exact description.

This invention relates to improvements in skeleton decks for use in the shipment of automobiles in freight cars.

One of the objects of the invention is the provision of a deck of this character which shall be possessed of unusual strength and yet be economical of lumber, and one which shall be capable of being easily and quickly assembled.

Another object of the invention is the provision of a novel support for the wheels of the automobile which shall hold them rigidly in place without the use of fastenings.

Other objects, and objects relating to details of construction and economies of manufacture will appear as we proceed with the description of that embodiment of the invention which, for the purposes of the present application, we have illustrated in the accompanying drawings, in which:

Figure I is a side elevation of a freight car in which our invention is employed, one wall of the car being broken away so as to disclose the decking to view.

Figure II is a horizontal section through one end of the car showing the decking in plan, with a portion of the chassis of an automobile in place thereon.

Figure III is a vertical section taken on the line III—III of Figure I.

Figure IV is a detail perspective view of a fragment of the decking.

Figure V is a detail sectional view taken on the line V—V of Figure II showing the wheel socket.

Figure VI is a transverse section taken on line VI—VI of Figure V, illustrating the U-shaped hanger which is employed as a stirrup for each wheel.

Like reference characters refer to similar parts throughout the views.

In the drawings 10, 11 and 12 are applied to the side walls, end walls and floor, respectively, of a freight car. The automobiles of the upper tier are each supported upon a scaffold or skeleton deck having on each side end legs 13 and two intermediate legs 14 of less height than the end legs. All the legs are vertical and lie against the side walls of the car to which they may be secured by any desired means.

Transverse rails 15 are mounted upon and secured to opposite legs 14, the joints being reinforced if desired by means of triangular blocks 16. Transverse rails 17 connect the upper ends of oppositely arranged legs 13, and these are also preferably reinforced by blocks 16.

The four transverse rails 15 and 17 support a pair of longitudinal beams 18 each of which comprises two rails 18' spaced apart by two pairs of blocks 19 each having one face inclined and preferably hollowed out to fit more or less closely the periphery of an automobile wheel. The two beams thus built up lie upon the rails 15 and are additionally supported by suspending from the rails 17. Small blocks 20 are nailed to the outer sides of the rails 18' and extend down below the latter and against one side of each rail 15 to which they are also fastened. Similar blocks 21 are nailed to the rails 18' and extend above the latter where they are nailed to the sides of the rails 17 which are towards the ends of the scaffold. The blocks 21 constitute brackets by means of which the rails 18' are suspended from the rails 17. It will be noted that the blocks 21 and 20 at either end of the deck are located upon opposite sides of the two rails 15 and 17 and thereby tend strongly to prevent longitudinal movement of the beams 18 with respect to the other members of the deck.

In the case of each of the end decks the transverse rails 17 at the ends of the car may be supported directly upon the end walls of the car and beneath the rails 18', thus eliminating four legs or posts 13. The decks, which are usually three in number, are spaced apart slightly, but are preferably connected at their ends by bars 22, and as the beams 18 of the end decks abut against the end walls 11 of the car there is formed in effect one long deck bearing at each end against the ends of the car which, therefore, are depended upon to take up most of the longitudinal thrust.

The spacing blocks 19 forming part of each beam 18 are but a trifle wider than the width of the tires of the automobile to be carried. Each of the four wheels of the automobile extend into the space between the rails of a beam and between the inclined ends of adjacent blocks 19, the weight being taken principally, however, by a strap 24 which depends in a loop between the rails 18, being formed with angularly bent ends adapted to extend over and grasp the tops of the rails. This strap will be referred to hereinafter as a stirrup. Each of the rails 17 may be notched as shown at 25 in Figures II, IV and V in order to receive the tire of the adjacent wheel and assist in steadying the same.

In loading a car, each of the end automobiles of the upper tier is hoisted just a little above its final position in the car, and there supported while the deck is built beneath it. Then the automobile is lowered into place, no fastenings of any kind being required, since the wheel sockets provided by our deck prevent any motion of the machine with respect to the deck. The end automobile of the lower tier may then be wheeled into place and fastened to the floor in any desired manner, the tires being removed to save vertical space where the height of the car being loaded requires it. When the four end automobiles are all properly loaded, the upper middle automobile is placed in position. Part of the middle deck may then be built into the car, but if this is done, before the lower automobile is brought into the car the intermediate legs or ports 14 on one side of the car must be omitted until the lower automobile is in position, as will be apparent. When all of the decks are completed they are tied together by means of the bars 22, and the car is then ready to ship.

While we have shown and described in considerable detail a specific embodiment of our invention, it is to be understood that this showing and description is illustrative only and for the purpose of rendering the invention clear, and that we do not regard the invention as limited to the details of construction as illustrated or described, or any of them, except in so far as we have included such limitations within the terms of the following claims, in which it is our intention to claim all novelty inherent in the invention broadly as well as specifically.

What we claim as new and desire to secure by Letters Patent is:

1. In an apparatus of the class described, a wheel support comprising a pair of parallel rails spaced the width of a wheel, a U-shaped strap hung upon and between said rails so as to form a wheel stirrup, and means mounted upon and between said rails at either side of the stirrup for engagement with the periphery of the wheel.

2. In an apparatus of the class described, a wheel support comprising a pair of parallel rails spaced the width of a wheel, a U-shaped strap hung upon and between said rails so as to form a wheel stirrup and blocks of the same width as the space between the rails, said blocks being mounted between and secured to the rails one on each side of said stirrup.

3. In an apparatus of the class described, a wheel support comprising a pair of parallel rails spaced the width of a wheel, a U-shaped strap hung upon and between said rails so as to form a wheel stirrup, and blocks of the same width as the space between the rails, said blocks being mounted between and secured to the rails one on each side of said stirrup, the inner ends of the blocks being cut to conform to the periphery of an automobile wheel.

4. A support for an automobile during shipment comprising two longitudinally extending beams spaced a distance equal to the wheel gauge of the automobile, each beam comprising a pair of rails and blocks mounted therebetween at intervals so as to space the rails apart the width of a wheel, and U-shaped straps hung upon and extending transversely between said rails so as to form a wheel stirrup under each wheel.

5. A support for an automobile during shipment comprising two longitudinally extending beams spaced a distance equal to the wheel gauge of the automobile, each beam comprising a pair of rails spaced apart the width of a wheel, U-shaped straps hung upon and extending transversely between said rails so as to form a wheel stirrup under each wheel, blocks of the same width as the space between the rails of each beam, said blocks being mounted between and secured to the rails near the stirrups for engagement with the wheels to prevent longitudinal motion of the automobile.

6. A support for an automobile during shipment, comprising two longitudinally extending beams spaced a distance substantially equal to the wheel gauge of the automobile, each beam comprising a pair of rails spaced apart the width of a wheel, U-shaped straps hung upon and extending transversely between said rails so as to form a wheel stirrup under each wheel, and blocks of the same width as the space between the rails of the beams, said blocks being mounted between and secured to the rails, one on each side of the said stirrups.

7. A support for an automobile during shipment, comprising two longitudinally extending beams spaced a distance substantially equal to the wheel gauge of the automobile, each beam comprising a pair of wheels spaced apart the width of a wheel, U-shaped straps hung upon and extending transversely between said rails as to form a wheel stirrup under each wheel, blocks of the same width as the space between the rails of the beam, said blocks being mounted upon and secured to the rails, one on each side of the said stirrups, the inner ends of the blocks for each wheel being cut to conform to the periphery of the wheel.

8. A skeleton deck for the shipment of automobiles in freight cars, comprising two longitudinally extending beams spaced a distance substantially equal to the wheel gauge of the automobile, means for supporting said beams above the level of the floor at a height greater than that of an automobile, each of said beams comprising a pair of rails and blocks mounted therebetween at intervals so as to space the rails apart the width of a wheel, U-shaped straps hung upon and extending transversely between said rails so as to form a wheel stirrup under each wheel, and a transverse rail mounted above the beam near one end thereof constituting an abutment for the wheel.

9. A skeleton deck for the shipment of automobiles in freight cars comprising two longitudinally extending beams spaced a distance substantially equal to the wheel gauge of the automobile, means for supporting said beams above the level of the floor at a height greater than that of an automobile, each of said beams comprising a pair of rails and blocks mounted therebetween at intervals so as to space the rails apart the width of a wheel, U-shaped straps hung upon and extending transversely between said rails so as to form a wheel stirrup under each wheel, and a transverse rail mounted above and attached to the beams near one end thereof, constituting a transverse brace for the deck and an abutment for the wheels.

10. A skeleton deck for the shipment of automobiles in freight cars comprising two longitudinally extending beams spaced a distance substantially equal to the wheel gauge of the automobile, means for supporting said beams above the level of the floor at a height greater than that of an automobile, each of said beams comprising a pair of rails and blocks mounted therebetween at intervals so as to space the rails apart the width of a wheel, U-shaped straps hung upon and extending transversely between said rails so as to form a wheel stirrup under each wheel, and a transverse rail mounted above the beams near one end thereof extending entirely across the car and bearing against the walls thereof, said transverse rail constituting a brace for the deck and an abutment for the wheels.

11. A skeleton deck for the shipment of automobiles in freight cars comprising two pairs of legs positioned against the walls on either side of the car, four transverse bars extending entirely across the car and mounted upon oppositely arranged legs, longitudinally extending beams spaced apart a distance substantially equal to the wheel gauge of the automobile, and supported upon the two intermediate transverse rails, each of said beams comprising a pair of rails spaced substantially the width of a wheel, hangers mounted upon said rails for supporting the wheels with portions thereof between the rails, the transverse bars constituting abutments for the wheels.

In testimony whereof we affix our signatures.

FRED H. THOMPSON.
EDWARD HOLMES.

Certificate of Correction.

It is hereby certified that in Letters Patent No. 1,421,747, granted July 4, 1922, upon the application of Fred H. Thompson and Edward Holmes, of Toledo, Ohio, for an improvement in "Automobile Decking," an error appears in the printed specification requiring correction as follows: Page 2, line 125, claim 7, for the word "wheels" read *rails;* and that the said Letters Patent should be read with this correction therein that the same may conform to the record of the case in the Patent Office.

Signed and sealed this 8th day of August, A. D., 1922.

[SEAL.]

KARL FENNING,
*Acting Commissioner of Patents.*